(12) United States Patent
Jang

(10) Patent No.: US 8,196,505 B2
(45) Date of Patent: Jun. 12, 2012

(54) BRAKE BOOSTER

(75) Inventor: Jae Ho Jang, Daegu (KR)

(73) Assignee: Hyundai Motor Company, Seoul (KR)

( * ) Notice: Subject to any disclaimer, the term of this patent is extended or adjusted under 35 U.S.C. 154(b) by 813 days.

(21) Appl. No.: 12/358,102

(22) Filed: Jan. 22, 2009

(65) Prior Publication Data

US 2010/0024637 A1 Feb. 4, 2010

(30) Foreign Application Priority Data

Jul. 31, 2008 (KR) ................. 10-2008-0075216

(51) Int. Cl.
 *B60T 13/128* (2006.01)
 *B60T 13/72* (2006.01)
(52) U.S. Cl. ..................... 91/369.1; 91/376 R
(58) Field of Classification Search .............. 91/369.1, 91/376 R, 379
See application file for complete search history.

(56) References Cited

U.S. PATENT DOCUMENTS

| | | | |
|---|---|---|---|
| 4,759,255 A * | 7/1988 | Shimamura | 91/376 R |
| 5,029,515 A * | 7/1991 | Endo | 91/369.1 |
| 5,193,429 A * | 3/1993 | Sugiura et al. | 91/369.1 |
| 5,526,729 A | 6/1996 | Ando et al. | |
| 5,881,628 A * | 3/1999 | Simon Bacardit | 91/369.1 |

FOREIGN PATENT DOCUMENTS

| | | |
|---|---|---|
| JP | 3-90465 A | 4/1991 |
| KR | 1994-014036 B1 | 7/1994 |
| KR | 1999-0019116 U | 6/1999 |
| KR | 2000-0026097 A | 5/2000 |
| KR | 2000-0029589 A | 5/2000 |

* cited by examiner

*Primary Examiner* — Thomas E Lazo
(74) *Attorney, Agent, or Firm* — Morgan, Lewis & Bockius LLP

(57) ABSTRACT

A brake booster includes a casing divided into a constant pressure chamber and a variable pressure chamber by a diaphragm, a power piston attached to the diaphragm, a disc-shaped stem coupled to the center of the power piston and having a through-hole, a plunger interposed between the stem and an input shaft to press/release the stem during reciprocation of the input shaft, and an air intake valve having a vacuum passage interconnecting the constant and variable pressure chambers. The air intake valve is inserted into the diaphragm and the power piston for close contact with the through-hole of the casing, and regulates air flowing from an atmosphere into the variable pressure chamber and from the variable pressure chamber into the constant pressure chamber during the reciprocation of the input shaft.

20 Claims, 6 Drawing Sheets

BRAKE BOOSTER

CROSS-REFERENCE TO RELATED APPLICATION

The present invention claims priority to Korean Patent Application No. 10-2008-0075216 filed on Jul. 31, 2008, the entire contents of which is incorporated herein for all purposes by this reference

BACKGROUND OF THE INVENTION

1. Field of the Invention

The present invention relates to a brake booster, and more particularly to a brake booster, in which a valve body and a poppet valve for regulating a flow of air of constant and variable pressure chambers are replaced by an integrated valve.

2. Description of Related Art

In general, a brake booster doubles a braking force applied to an input shaft using a difference between vacuum and atmospheric pressure, and then transmits the boosting force to an output shaft.

As illustrated in FIG. 1, a conventional brake booster includes a casing 10; a diaphragm 31 partitioning the casing 10 into a constant pressure chamber 21 and a variable pressure chamber 22; a stepped valve body 60, wherein one end thereof is slidably connected to the center of the diaphragm 31, the other end thereof protrudes to outside the casing 10, and an interior thereof is formed as a hollow cavity 63; an input shaft 40 located in the hollow cavity 63 of the valve body 60 to receive a pressing force generated by manipulation of a brake pedal; and an output shaft 50 transmitting a boosting force generated from the valve body 60 to a master cylinder.

The casing 10 is divided into the constant pressure chamber 21 and the variable pressure chamber 22 by the diaphragm 31. The force generated by a pressure difference between the constant pressure chamber 21 and the variable pressure chamber 22 is transmitted to a power piston 32, which abuts on the diaphragm 31. The centers of the diaphragm 31 and the power piston 32 are fixed to the valve body 60.

The constant pressure chamber 21 is provided with a vacuum connecting pipe 12, which communicates with an intake system of a motor vehicle engine, on outer wall of one side thereof. A return spring 80 is installed in the constant pressure chamber 21. Thus, when a brake is inactive, the diaphragm 31 and the power piston 32 will return to their original positions by an elastic restoring force of the return spring 80.

The input shaft 40 is a multistage shaft, a leading end of which is coupled with a plunger 70, which transmits the pressing force applied to the input shaft 40 to the output shaft 50. A reaction disc 51 made of elastic material is interposed between the plunger 70 and the output shaft 50. There is a predetermined gap between the plunger 70 and the reaction disc 51.

The input shaft 40 is located at the center of the valve body 60, which has a cylinder 65 into which the plunger 70 is slidably inserted in addition to the hollow cavity 63 serving as an external air inflow passage. In the hollow cavity 63, there are installed a poppet valve 64 regulating inflow of external air, and a poppet retainer airtightly fixing a rear end of the poppet valve 64 to an inner circumference of the hollow cavity 63. A return spring 23, that is a conical compressive coil spring, is installed between the poppet valve 64 and the step of the input shaft 40 so as to return the input shaft 40 in a backward direction (i.e. to the left).

This motor vehicle brake booster is configured in such a manner that the constant and variable pressure chambers are kept in a vacuum state by the intake system of the motor vehicle engine. In this state, when a driver steps on a brake pedal, the input shaft 40 advances to the left, and thus the external air rapidly flows into the variable pressure chamber 22 in a loaded state through the valve body 60. As a result, the variable pressure chamber 22 is kept under atmospheric pressure. When the variable pressure chamber 22 is kept under atmospheric pressure, there occurs a pressure difference between the variable pressure chamber 22 under atmospheric pressure and the constant pressure chamber 21 under negative pressure. Due to this pressure difference, the power piston 32 is pushed toward the constant pressure chamber 21. At this time, the valve body 60 connected to the power piston 32 moves together, and pushes the output shaft 50. The output that is more amplified than the input by this operation is transmitted to a master cylinder assembly through the output shaft, and thus braking hydraulic pressure is generated.

When the driver releases the brake pedal, the input shaft 40 returns to its original position by the elastic restoring forces of the return spring 80 and the power piston 32. In addition, the air of the variable pressure chamber 22 flows out to the constant pressure chamber 21 under vacuum through a vacuum passage, and the air of the constant pressure chamber 21 flows out to the outside through the vacuum connecting pipe 12 and a vacuum hose. As a result, the brake booster enters an initial state.

As described above, the conventional brake booster employs the valve body 60 and the poppet valve 64 in order to control the intake of the air. Thus, the number of parts is relatively increased, and thus assembly and management of parts are complicated. Consequently, the overall productivity of the brake booster is lowered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide a brake booster, which employs a single valve having universal applicability instead of a valve body and a poppet valve in order to regulate inflow of air, thereby reducing production costs through reduction in number of parts, increasing easiness and rapidity of assembling work and the resultant productivity.

One aspect of the present invention is directed to a brake booster including a casing divided into a constant pressure chamber and a variable pressure chamber by a diaphragm, the casing having a through-hole in one side thereof, a power piston attached to the diaphragm, a disc-shaped stem coupled to a center of the power piston and having a through-hole, a plunger interposed between the stem and an input shaft connected to a brake pedal, the plunger pressing or releasing the stem by means of reciprocation of the input shaft, and/or an air intake valve having a vacuum passage through which the constant pressure chamber communicates with the variable pressure chamber. The air intake valve may be inserted into the diaphragm and the power piston so as to be in close contact with the casing through-hole, and the air intake valve may regulate air flowing from an atmosphere into the variable pressure chamber and air flowing from the variable pressure chamber into the constant pressure chamber by reciprocation of the input shaft.

The air intake valve may include a hollow cylinder and a body which may extend through and slidably be coupled with the cylinder. The body may include a leading end having a cross-sectional profile corresponding to a cross-sectional profile of the casing through-hole and coming into close contact with an inner surface of the through-hole of the casing, and/or a trailing end preventing separation of the cylinder.

The air intake valve may be configured in such a manner that, when the stem may be released from the input shaft, a leading end of the air intake valve comes into close contact with the casing through-hole to prevent external air from flowing into the variable pressure chamber and opens the vacuum passage, and/or when the stem is pressed by the input shaft, the vacuum passage may be closed by movement of the cylinder and the leading end of the air intake valve away from the casing through-hole to allow the external air to flow into the variable pressure chamber.

The cylinder may have a shape of a circular column. The trailing end of the air intake valve may have a tapered cross-sectional profile. The leading end of the air intake valve may have a magnet attached to an outer surface thereof. The cylinder may be screwed to the diaphragm and the power piston.

Another aspect of the present invention is directed to a brake booster including a diaphragm having a first through-hole, a casing having a second through-hole and a third through-hole and divided into a constant pressure chamber and a variable pressure chamber by the diaphragm, wherein the variable pressure chamber may be configured to communicate with atmosphere through the second through-hole, a power piston attached to the diaphragm and having a fourth through-hole, a stem coupled to a center of the power piston and a portion of the diaphragm and elastically supported by a first elastic member installed in the constant pressure chamber toward an input shaft, a plunger, one end of which may be sealably and slidably coupled through the third through-hole of the casing to the input shaft connected to a brake pedal and the other end of which may be slidably coupled to the stem, the plunger pressing or releasing the stem by the input shaft, and/or an air intake valve inserted into the first through-hole of the diaphragm and the fourth through-hole of the power piston and forming a vacuum passage between the constant pressure chamber and the variable pressure chamber to communicate therebetween with closing or opening the second through-hole to selectively regulate air flowing from the atmosphere into the variable pressure chamber and air flowing from the variable pressure chamber into the constant pressure chamber by the input shaft.

The first elastic member may be a compression spring. A second elastic member may be displaced between the stem and a portion of the plunger in the variable pressure chamber. The second elastic member may be a compression spring The air intake valve may include a hollow cylinder to form the vacuum passage therethrough, a body slidably coupled within the cylinder and extending outward the hollow cylinder, a third elastic member biasing the body toward the second through-hole, a trailing end formed at rear end of the body, a leading edge formed at front end of the body, and/or a holding member formed on the leading edge and opening or closing the vacuum passage between the constant pressure chamber and the variable pressure chamber by selectively blocking the second through-hole of the variable pressure chamber.

A maximum elastic force of the third elastic member may be smaller than holding force of the holding member. The trailing end may have a tapered side cross-sectional shape.

The trailing end may have a step side cross-sectional shape. The leading end may include a side cross-sectional shape corresponding to a side cross-sectional shape of the second through-hole of the casing and selectively coming into contact with an inner surface of the second through-hole of the casing. The trailing end have a larger diameter than diameter of inner circumference of the hollow cylinder to prevent separation of the body from the hollow cylinder. The cylinder may be configured to be screwed to the first through-hole of the diaphragm and the fourth through-hole of the power piston.

The air intake valve may be configured in such a manner that, when the stem may be released from the input shaft, the leading end of the air intake valve comes into close contact with the second through-hole of the casing to prevent external air from flowing into the variable pressure chamber, and the vacuum passage may be open, and/or when the stem may be pressed by the input shaft, the vacuum passage may be closed by movement of the cylinder, and the leading end of the air intake valve may be separated from the second through-hole of the casing to allow the external air to flow into the variable pressure chamber.

A vehicle brake system may include any of the brake boosters defined above.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
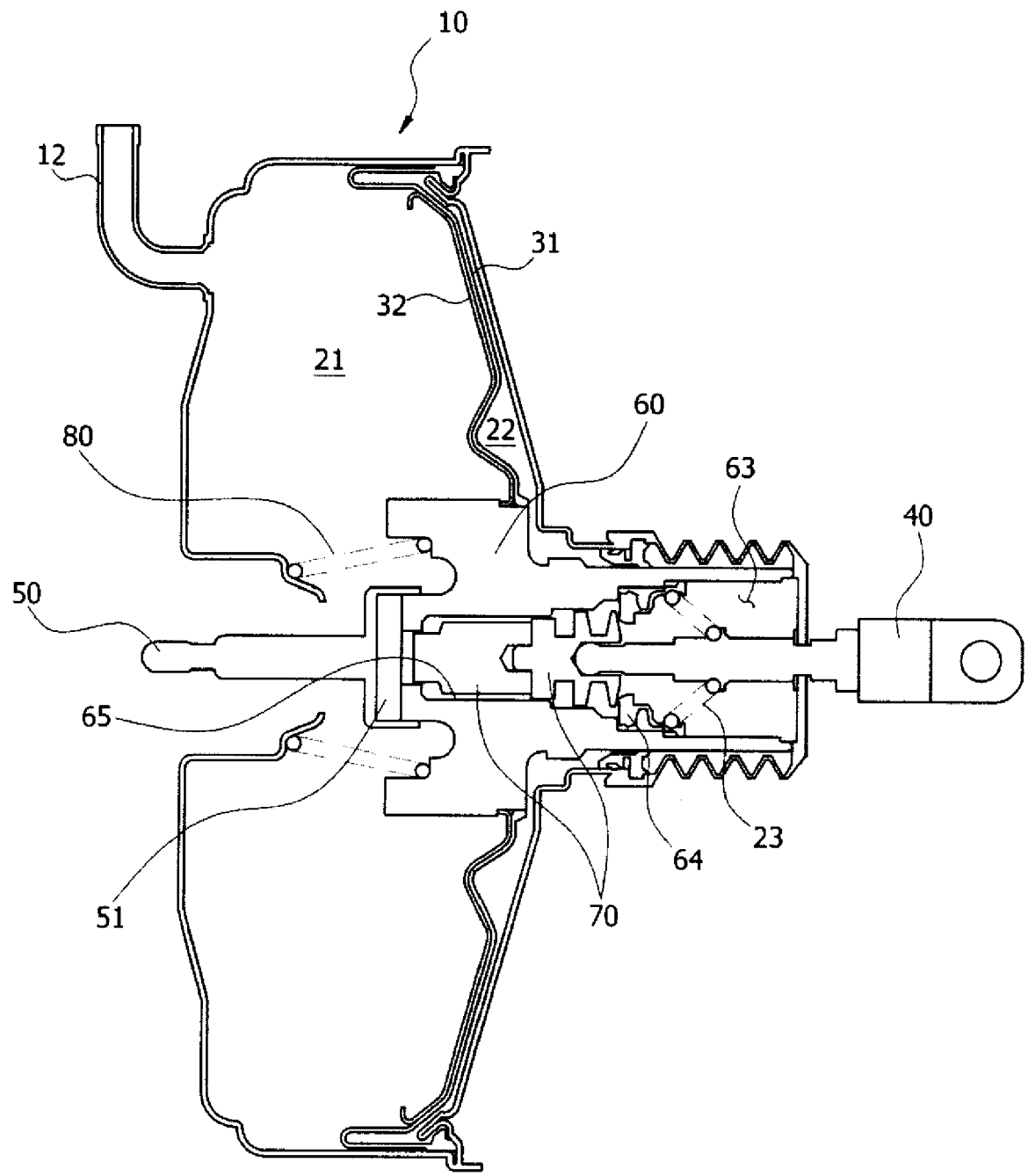
FIG. 1 is a side cross-sectional view illustrating the structure of a brake booster.
Figure 2:
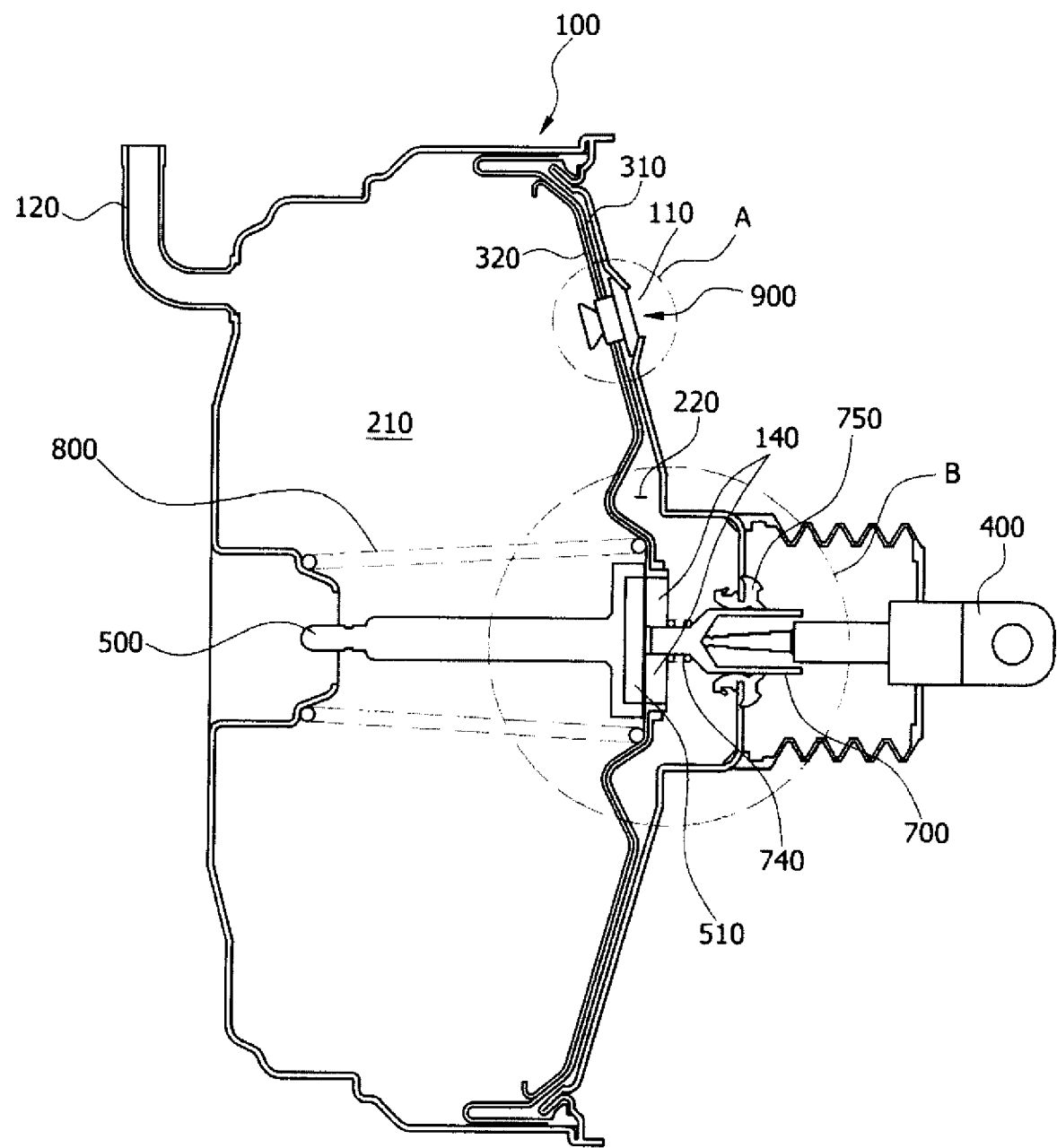
FIG. 2 is a side cross-sectional view illustrating the structure of an exemplary brake booster according to the present invention.
Figure 3A:
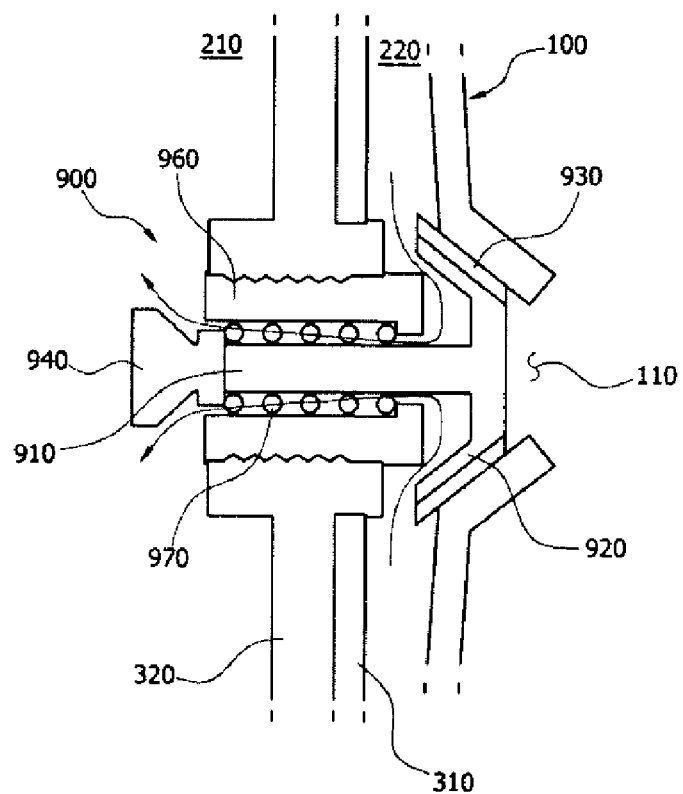
FIGS. 3A through 3C are enlarged cross-sectional views of detail A sequentially illustrating operation of the exemplary brake booster of FIG. 2.
Figure 3B:
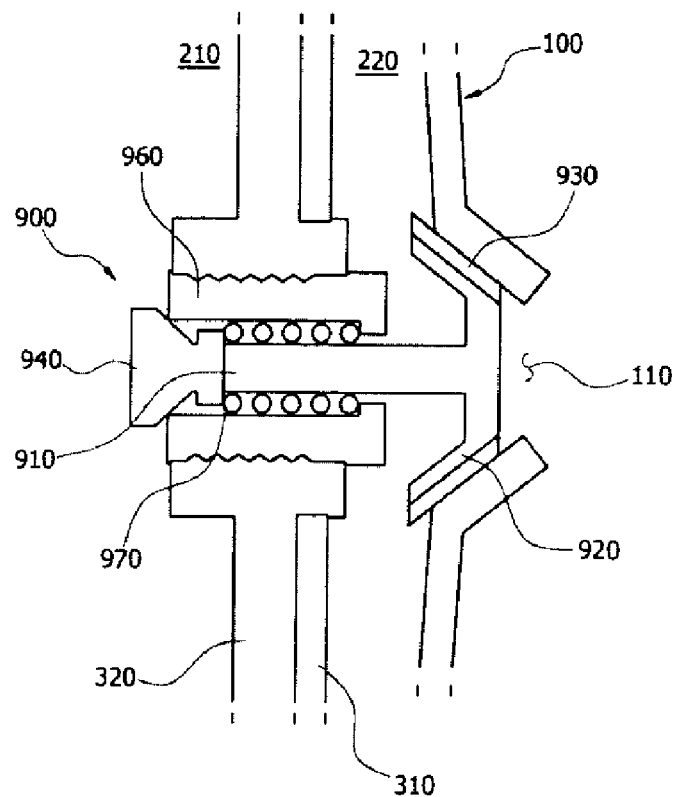
Figure 3C:
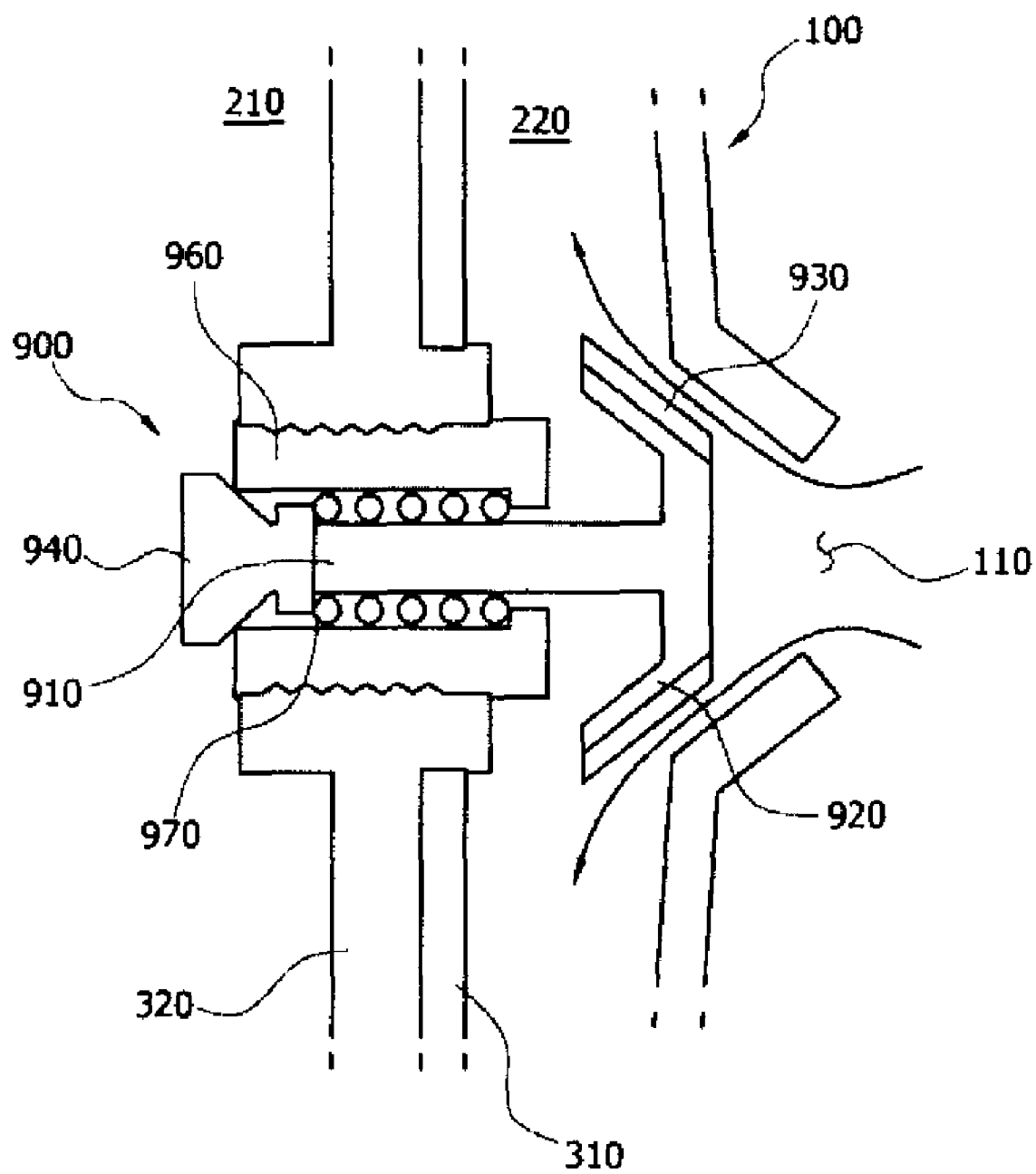
Figure 4A:
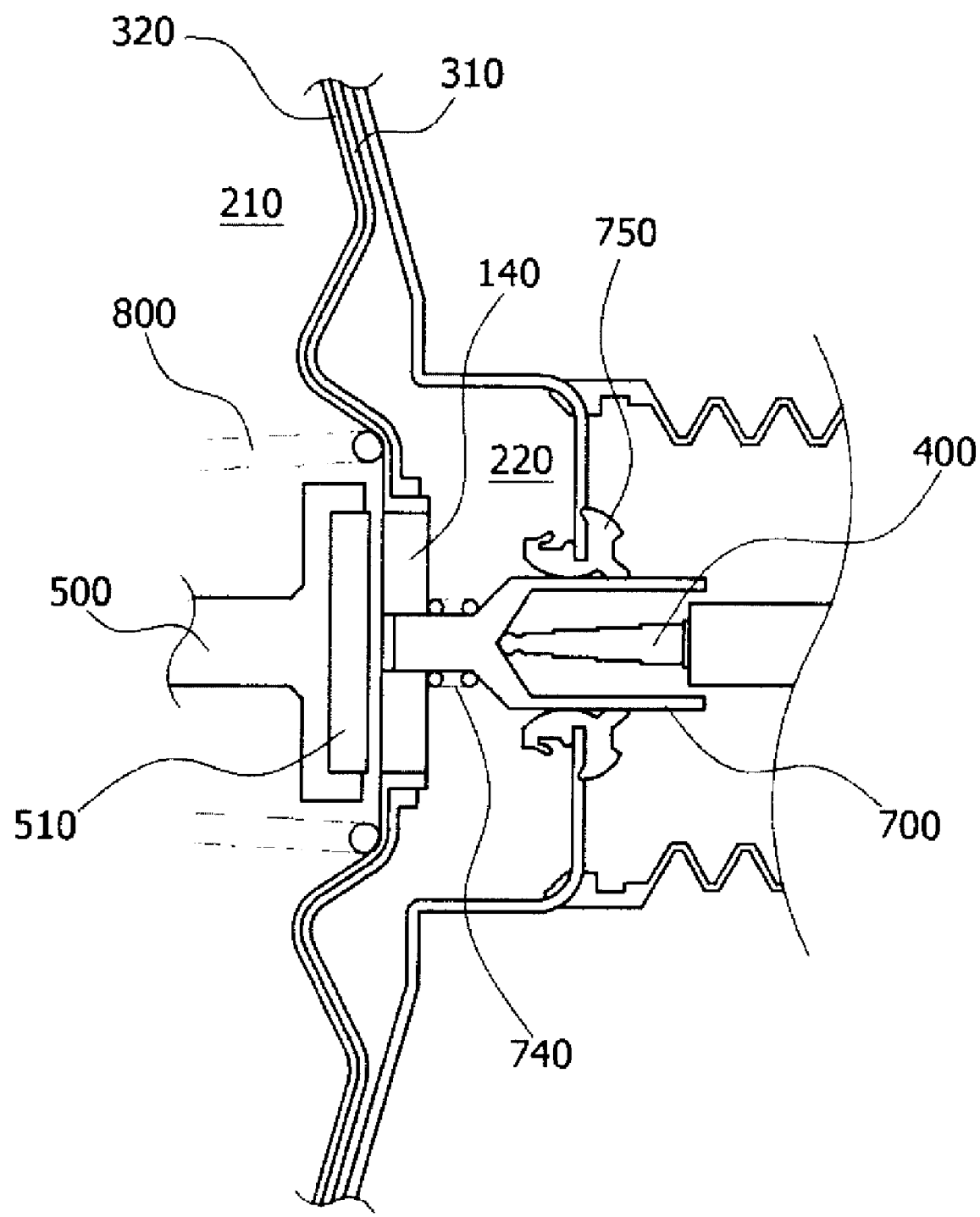
FIGS. 4A and 4B are enlarged cross-sectional views of detail B sequentially illustrating operation of the exemplary brake booster of FIG. 2.
Figure 4B:
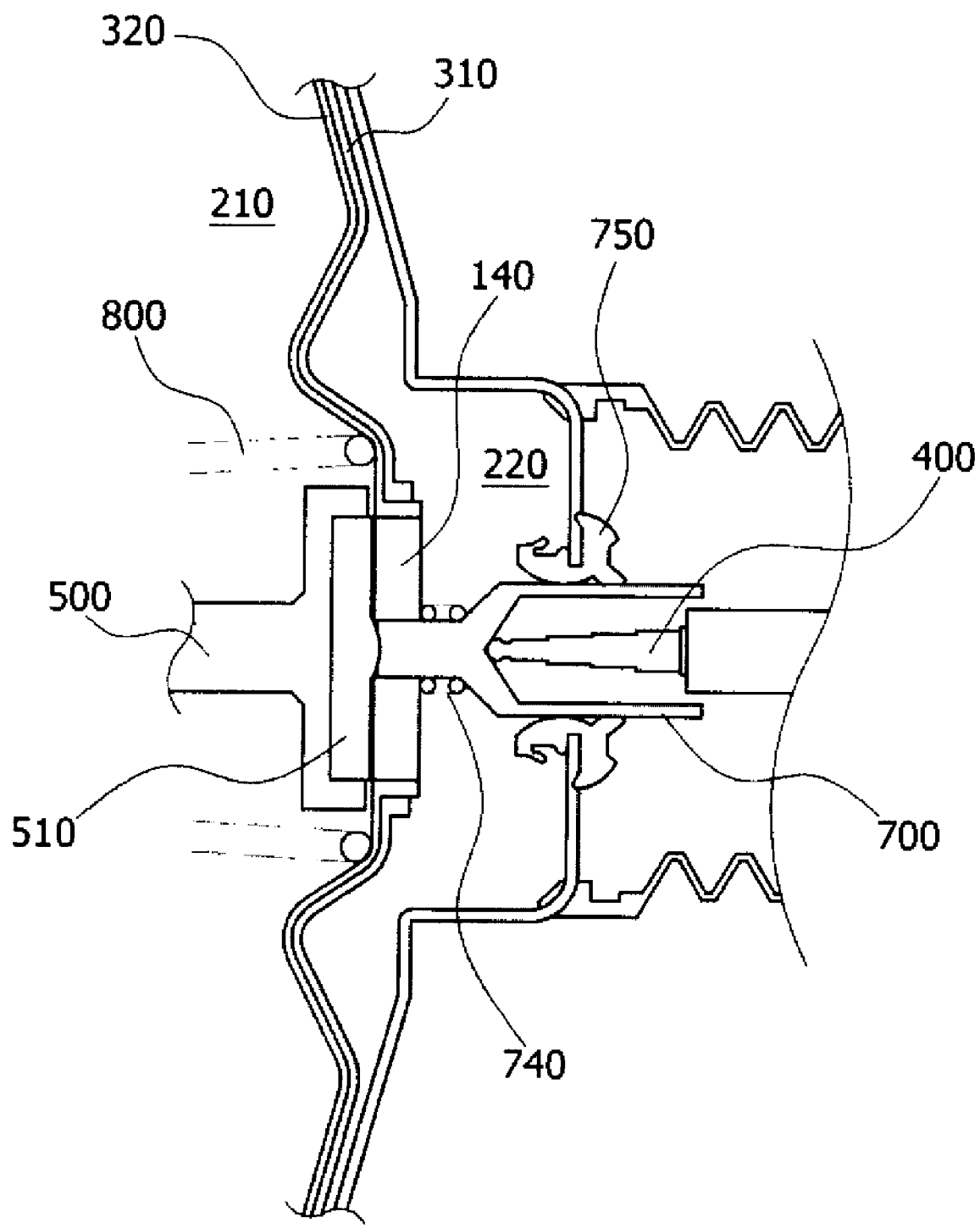

FIG. 2 is a side cross-sectional view illustrating the structure of a brake booster according to an exemplary embodiment of the present invention. FIGS. 3A-3C are enlarged cross-sectional views of part A sequentially illustrating operation of the brake booster of FIG. 2. FIGS. 4A-4C are enlarged cross-sectional views of part B sequentially illustrating operation of the brake booster of FIG. 2.

According to various embodiments of the present invention, as illustrated in FIG. 2, the brake booster generally includes a casing 100, an input shaft 400 receiving a pressing force generated by manipulation of a brake pedal, and an output shaft 500 transmitting a boosting force generated by operation of the input shaft 400 to a master cylinder.

The casing 100 is divided into a constant pressure chamber 210 and a variable pressure chamber 220 by a diaphragm 310. The constant and variable pressure chambers 210 and 220 selectively communicate with each other through a vacuum passage formed in an air intake valve 900 which will be described below. A force generated by a pressure difference between the constant pressure chamber 210 and the variable pressure chamber 220 is transmitted to a power piston 320, which abuts on the diaphragm 310 in front of the diaphragm 310. The constant pressure chamber 210 is provided with a vacuum connecting pipe 120, which communicates with an intake system of a motor vehicle engine, on outer wall of one side thereof. A return spring 800 is installed in the constant pressure chamber 210. Thus, when a brake is inactive, the diaphragm 310 and the power piston 320 are returned to their original positions by an elastic restoring force of the return spring 800.

A disc stem 140, in the center of which a through-hole is formed, is coupled with the centers of the diaphragm 310 and the power piston 320. Thus, when the stem 140 is pushed on one side, the diaphragm 310 and the power piston 320 which are coupled to the stem 140 moves along with the stem 140.

The input shaft 400 is coupled with a plunger 700 at a leading end thereof which transmits the pressing force applied to the input shaft 400 to the output shaft 500. A reaction disc 510 made of elastic material is interposed between the plunger 700 and the output shaft 500. There is a predetermined gap between the plunger 700 and the reaction disc 510.

The leading end of the plunger 700 is slidably inserted into the through-hole of the stem 140 installed in the center of the diaphragm 310. At this time, the stem 140 is completely sealed by the plunger 700, so that a flow of air between the constant pressure chamber 210 and the variable pressure chamber 220 is interrupted.

The trailing end of the plunger 700 protrudes to the outside of the casing 100. A seal 750 is installed at a place where the casing 100 intersects with the plunger 700, so that the air is prevented from flowing into the variable pressure chamber 220 despite of movement of the plunger 700.

A return spring 740, a compressive coil spring, is installed between the plunger 700 and the stem 140 so as to return the plunger 700 in a backward direction while the input shaft 400 is not pressed.

Each of the casing 100, diaphragm 310 and power piston 320 is provided with a through-hole 110 on one side thereof. The integrated air intake valve 900, which regulates the flow of air flowing from the variable pressure chamber 220 into the constant pressure chamber 210 and the flow of air flowing from the atmosphere into the variable pressure chamber 220, is inserted into and fixed in the through-holes 110.

In an exemplary embodiment of the present invention, the air intake valve 900 is for replacing conventional valve body and poppet valve, and includes a hollow cylinder 960 and a body 910 passing through the cylinder 960 and slidably coupled with the cylinder 960. A spring 970 is interposed between the body 910 and the cylinder 960. The cylinder 960 has various shapes such as a circular column, a quadrilateral column, and so on, and preferably the circular column shape for the purpose of easy assembly. When the body 910 is inserted into the cylinder 960, a predetermined space is defined between an outer surface of the body 910 and an inner wall of the cylinder 960. This space serves as a vacuum passage. The constant pressure chamber 210 and the variable pressure chamber 220 selectively communicate with each other through the vacuum passage, so that the air of the variable pressure chamber 220 flows into the constant pressure chamber 210 therethrough.

The through-hole 110 of the casing 100 has a conical shape in which the casing 100 protrudes to the atmosphere. When a leading end 920 of the body 910 of the air intake valve 900 is in close contact with the through-hole 110, external air is prevented from flowing into the variable pressure chamber 220. Further, a magnet 930 is attached to an outer surface of the leading end 920 of the body 910 of the air intake valve 900, so that the body 910 is attached to the casing 100 made of steel by magnetic force of the magnet 930 for sealing efficiency.

The trailing end 940 of the body 910 of the air intake valve 900 is formed in a shape that, in moving with the diaphragm 310, the cylinder 960 is caught on the body 910 without being separated from the body 910. The trailing end 940 of the body 910 has a cross-sectional shape, such as a stepped shape or a tapered shape, which can be variously modified.

Further, the through-holes of the diaphragm 310 and the power piston 320 and an outer circumference of the cylinder 960 are provided with screw threads. Thereby, the air intake valve 900 can be easily fastened to the diaphragm 310, and the constant pressure chamber 210 is airtightly sealed against the outside.

Now, the operation of the brake booster according to the exemplary embodiment of the present invention will be described below.

First, in an inactive state of the brake booster before a driver steps on a brake pedal, as illustrated in FIG. 3A, the leading end 920 of the body 910 of the air intake valve 900 is in contact with an inner surface of the casing 100. In this state, the constant pressure chamber 210 is under the influence of negative pressure generated from the intake system of the engine. This negative pressure is transmitted to the variable pressure chamber 220 through the vacuum passage in the cylinder 960 of the air intake valve 900. Thus, the air in the variable pressure chamber 220 flows to the vacuum connecting pipe 120 via the constant pressure chamber 210 through the air intake valve 900. Thus, the constant pressure chamber 210 and the variable pressure chamber 220 are kept under negative pressure, and the diaphragm 310 is maintained at a stop position by elasticity of the return spring 800

In this state, when the driver steps on the brake pedal, the input shaft 400 advances to push the plunger 700, and the stem 140 is also pushed toward the constant pressure chamber 210 by the return spring 740 interposed between the plunger 700 and the stem 140. At this time, a value of elastic modulus of the return spring 800 installed in the constant pressure chamber 210 is designed to be smaller than that of the return spring 740 interposed between the plunger 700 and the stem 140. Thereby, when the input shaft 400 pushes the plunger 700, a distance at which each of the diaphragm 310 and the power piston 320 moves is much longer than that at which the plunger 70 of the conventional art moves.

Thus, the diaphragm 310 slightly advances to the constant pressure chamber 210. When the diaphragm 310 moves, the air intake valve 900 coupled with the diaphragm 310 moves as well. However, since the body 910 of the air intake valve 900 continues to be attached to the casing 100 by the magnet 930 installed on the leading end 920 thereof, only the cylinder 960 moves along with the diaphragm 310. As described above, the moving cylinder 960 comes into close contact with the tapered trailing end 940 of the body 910, so that the vacuum passage of the air intake valve 900 is blocked, and thus the vacuum negative pressure applied to the variable pressure chamber 220 is interrupted. In this state, as illustrated in FIG. 4A, the stem 140 is spaced apart from the reaction disc 510 at a predetermined interval.

Afterwards, when the input shaft 400 further pushes the plunger 700, the stem 140 is pushed, and the diaphragm 310 connected to the stem 140 is further pushed as well. When the stem 140 is pushed to contact the reaction disc 510, the stem 140 presses the reaction disc 510, as illustrated in FIG. 4B. The pressed reaction disc 510 of elastic material is deformed toward the plunger 700 so as to fill up the gap between the plunger 700 and the reaction disc 510. The cylinder 960 of the air intake valve 900 is also pushed forwards. One end of the cylinder 960 is caught on the tapered trailing end 940 of the body 910 of the air intake valve 900, and thus the body 910 of the air intake valve 900 is pulled toward the constant pressure chamber 210. Thereby, the leading end 920 of the body 910 of the air intake valve 900 is separated from the casing 100. As soon as the contact between the casing 100 and the leading end 920 of the body 910 of the air intake valve 900 is released, the external air rapidly flows into the variable pressure chamber 220 through the through-hole 110 of the casing 100. Thereby, the variable pressure chamber 220 is under atmospheric pressure.

When the variable pressure chamber 220 is under atmospheric pressure, there occurs a pressure difference between the variable pressure chamber 220 under atmospheric pressure and the constant pressure chamber 210 under negative pressure. As such, the power piston 320 is pushed toward the constant pressure chamber 210. At this time, the stem 140 connected to the power piston 320 also moves to push the output shaft 500. While the reaction disc 510 fills up the gap between the plunger 700 and the output shaft 500, the output shaft 500 does not come into direct contact with the plunger 700. For this reason, a reaction force of the output shaft 500 is not transmitted to the plunger 700, and thus the braking force is sharply increased without an increase in input. This phenomenon is called "jump-in" effect. An output value occurring at this time is called a jump-in value.

Thereafter, when the reaction disc 510 begins to contact the plunger 510, the reaction force of the output shaft 500 is transmitted to the input shaft 400. After that, the output proportional to the input is formed.

The output that is more amplified than the input by the aforementioned operation is transmitted to the master cylinder assembly through the output shaft, and thus braking hydraulic pressure is generated.

Meanwhile, when the driver releases the brake pedal, the diaphragm 310 and the input shaft 400 are returned to their original positions by the elastic restoring forces of the return spring 800 and the power piston 320. The air intake valve 900 also retreats toward the casing 100, and thus the body 910 of the air intake valve 900 is again attached to the through-hole 110 of the casing 100. Accordingly, the vacuum passage through which the constant pressure chamber 210 communicates with the variable pressure chamber 220 is open. As a result, the air of the variable pressure chamber 220 flows into the constant pressure chamber 210 under vacuum through the vacuum passage, and the air of the constant pressure chamber 210 flows out through the vacuum connecting pipe 120 and the vacuum hose. Thereby, the brake booster enters an initial state.

According to various embodiments of the present invention, the brake booster employs an integrated valve performing the same function as a valve body and a poppet valve instead of the valve body and the poppet valve, so that it can reduce the number of parts, production costs, and the number of processes and time for assembling work to thus increase productivity of products. Further, it is not necessary to separately develop a valve body depending on changes in size and shape of the brake booster, so that the brake booster can reduce expenses required for developing a new brake booster.

For convenience in explanation and accurate definition in the appended claims, the terms "front", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake booster comprising:
   a casing divided into a constant pressure chamber and a variable pressure chamber by a diaphragm, the casing having a through-hole in one side thereof;
   a power piston attached to the diaphragm;
   a disc-shaped stem coupled to a center of the power piston and having a through-hole;
   a plunger interposed between the stem and an input shaft connected to a brake pedal, the plunger pressing or releasing the stem by means of reciprocation of the input shaft; and
   an air intake valve having a vacuum passage through which the constant pressure chamber communicates with the variable pressure chamber, wherein the air intake valve is inserted into the diaphragm and the power piston so as to be in close contact with the casing through-hole, and wherein the air intake valve regulates air flowing from an atmosphere into the variable pressure chamber and air flowing from the variable pressure chamber into the constant pressure chamber by reciprocation of the input shaft.

2. The brake booster according to claim 1, wherein:
   the air intake valve includes a hollow cylinder and a body extending through and slidably coupled with the cylinder; and
   the body includes a leading end having a cross-sectional profile corresponding to a cross-sectional profile of the casing through-hole and coming into close contact with an inner surface of the through-hole of the casing, and a trailing end preventing separation of the cylinder.

3. The brake booster according to claim 1, wherein the air intake valve is configured in such a manner that:
   when the stem is released from the input shaft, a leading end of the air intake valve comes into close contact with the casing through-hole to prevent external air from flowing into the variable pressure chamber and opens the vacuum passage; and
   when the stem is pressed by the input shaft, the vacuum passage is closed by movement of the cylinder and the leading end of the air intake valve away from the casing through-hole to allow the external air to flow into the variable pressure chamber.

4. The brake booster according to claim 3, wherein the cylinder has a shape of a circular column.

5. The brake booster according to claim 4, wherein the cylinder is screwed to the diaphragm and the power piston.

6. The brake booster according to claim 3, wherein the trailing end of the air intake valve has a tapered cross-sectional profile.

7. The brake booster according to claim 3, wherein the leading end of the air intake valve has a magnet attached to an outer surface thereof.

8. A brake booster comprising:
   a diaphragm having a first through-hole;
   a casing having a second through-hole and a third through-hole and divided into a constant pressure chamber and a variable pressure chamber by the diaphragm, wherein the variable pressure chamber is configured to communicate with atmosphere through the second through-hole;
   a power piston attached to the diaphragm and having a fourth through-hole;
   a stem coupled to a center of the power piston and a portion of the diaphragm and elastically supported by a first elastic member installed in the constant pressure chamber toward an input shaft;
   a plunger, one end of which is sealably and slidably coupled through the third through-hole of the casing to the input shaft connected to a brake pedal and the other end of which is slidably coupled to the stem, the plunger pressing or releasing the stem by the input shaft; and
   an air intake valve inserted into the first through-hole of the diaphragm and the fourth through-hole of the power piston and forming a vacuum passage between the constant pressure chamber and the variable pressure chamber to communicate therebetween with closing or opening the second through-hole to selectively regulate air flowing from the atmosphere into the variable pressure chamber and air flowing from the variable pressure chamber into the constant pressure chamber by the input shaft.

9. The brake booster according to claim 8, wherein the first elastic member is a compression spring.

10. The brake booster according to claim 8, wherein a second elastic member is displaced between the stem and a portion of the plunger in the variable pressure chamber.

11. The brake booster according to claim 10, wherein the second elastic member is a compression spring.

12. The brake booster according to claim 8, wherein the air intake valve comprises:
   a hollow cylinder to form the vacuum passage therethrough;
   a body slidably coupled within the cylinder and extending outward the hollow cylinder;
   a third elastic member biasing the body toward the second through-hole;
   a trailing end formed at rear end of the body;
   a leading edge formed at front end of the body; and
   a holding member formed on the leading edge and opening or closing the vacuum passage between the constant pressure chamber and the variable pressure chamber by selectively blocking the second through-hole of the variable pressure chamber.

13. The brake booster according to claim 12, wherein a maximum elastic force of the third elastic member is smaller than holding force of the holding member.

14. The brake booster according to claim 12, wherein the trailing end has a tapered side cross-sectional shape.

15. The brake booster according to claim 12, wherein the trailing end has a step side cross-sectional shape.

16. The brake booster according to claim 12, wherein the leading end includes a side cross-sectional shape corresponding to a side cross-sectional shape of the second through-hole of the casing and selectively coming into contact with an inner surface of the second through-hole of the casing.

17. The brake booster according to claim 12, wherein the trailing end have a larger diameter than diameter of inner circumference of the hollow cylinder to prevent separation of the body from the hollow cylinder.

18. The brake booster according to claim 12, wherein the cylinder is configured to be screwed to the first through-hole of the diaphragm and the fourth through-hole of the power piston.

19. The brake booster according to claim 12, wherein the air intake valve is configured in such a manner that:
   when the stem is released from the input shaft, the leading end of the air intake valve comes into close contact with the second through-hole of the casing to prevent external air from flowing into the variable pressure chamber, and the vacuum passage is open; and
   when the stem is pressed by the input shaft, the vacuum passage is closed by movement of the cylinder, and the leading end of the air intake valve is separated from the second through-hole of the casing to allow the external air to flow into the variable pressure chamber.

20. A vehicle brake system, the brake system comprising the brake booster defined in claim 8.

* * * * *